United States Patent [19]

Simpson

[11] 4,187,716
[45] Feb. 12, 1980

[54] CONDENSER LEAK SEARCHING PLUGS

[76] Inventor: Robert Simpson, 84B Eglinton Rd., Ardrossan, Ayrshire, Scotland

[21] Appl. No.: 886,933

[22] Filed: Mar. 15, 1978

Related U.S. Application Data

[63] Continuation of Ser. No. 733,854, Oct. 19, 1976, abandoned.

[30] Foreign Application Priority Data

Oct. 22, 1975 [GB] United Kingdom ............ 43244/75

[51] Int. Cl.² ............................................. G01M 3/28
[52] U.S. Cl. ........................................ 73/40; 73/49.1
[58] Field of Search ................. 73/40, 49.1, 49.5, 48, 73/46; 138/90

[56] References Cited

U.S. PATENT DOCUMENTS

| | | | |
|---|---|---|---|
| 1,586,127 | 5/1926 | Storm | 73/48 |
| 2,534,830 | 12/1950 | Philo | 73/40 |
| 3,996,789 | 12/1976 | Wilson | 73/46 X |

*Primary Examiner*—Gerald Goldberg
*Assistant Examiner*—Joseph W. Roskos
*Attorney, Agent, or Firm*—Gerald J. Ferguson, Jr.; Joseph J. Baker

[57] ABSTRACT

A condenser leak searching plug having a tapered body, a recess extending into the body from the larger end face thereof, a resiliently yieldable, non-protruding planar membrane covering and sealing the open side of the recess where the membrane forms the central part of a cap of elastic material which fits over the larger end of the body and a through duct extending from the recess to the smaller end face of the body.

3 Claims, 2 Drawing Figures

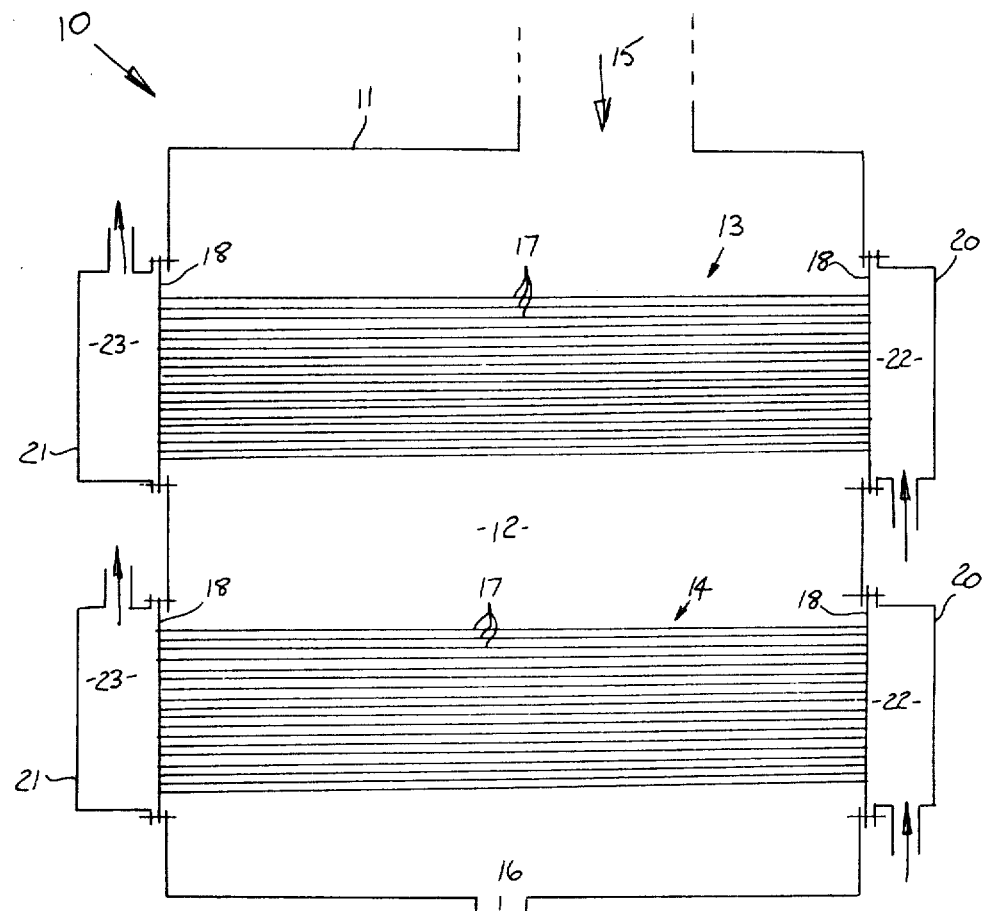
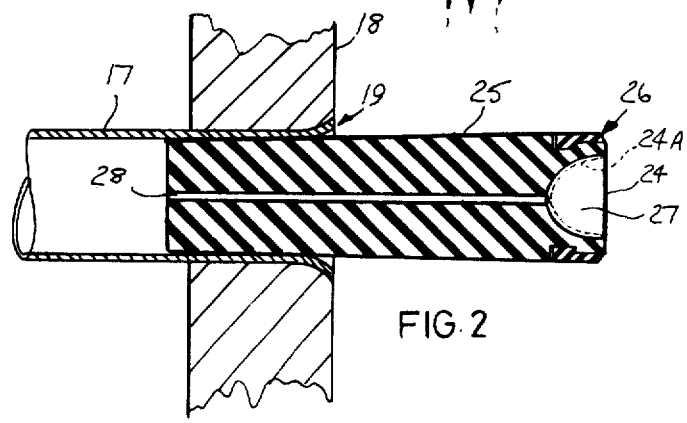
FIG.1
FIG.2

CONDENSER LEAK SEARCHING PLUGS

This is a continuation, of application Ser. No. 733,854, filed Oct. 19, 1976, now abandoned.

This invention relates to a method of and an appliance for use in detecting leakage from the coolant tubes to the condensate space in a vapour condenser or heat exchanger.

A vapour condenser or heat exchanger consists essentially of a casing the interior or condensate space of which is spanned by a plurality of metal tubes. Means are provided for admitting vapour to and for recovering condensate from the interior of the casing. Heat in the vapour is transferred through the walls of the tubes to a coolant, for example water, flowing through the tubes. The opposite end portions of the coolant tubes extend out of the casing and communicate commonly with in-flow and out-flow chambers for the delivery of coolant to and from the tubes. The process of condensation produces a vacuum pressure condition within the interior of the casing and consequently a pressure differential across the walls of the coolant tubes. Thus, if a coolant tube deteriorates coolant may leak into the condensate space and so contaminate the condensate.

A known method of detecting leakage from the coolant tubes to the condensate space consists of the steps of opening the in-flow and out-flow coolant chambers to gain access to the open ends of the tubes, closing one end of each tube with a bung, and applying a vacuum pressure gauge such as a manometer to the other end of each tube in turn while vacuum pressure is maintained within the condenser casing. Thus, an indication of vacuum pressure in any tube reveals the presence of a leak path from that tube to the condensate space. A vapour condenser installation may have two or more independently operable sets of coolant tubes spanning a common condensate space, and each set of tubes may consist of 1,000 or more tubes. The known detection method, therefore, is a tedious, time-consuming and relatively costly operation. Moreover, the sensitivity of the known detection method to the presence of minute leak paths is inversely proportional to the duration of each application of the vacuum pressure gauge or manometer.

According to the present invention, a method of detecting leakage from coolant tubes to a condensate space in a vapour condenser comprises the steps of closing the tubes by means of separate resiliently yieldable membranes applied one to each of the tubes, and subsequently observing which, if any, of the membranes displays a deflection due to a vacuum pressure condition within the tube.

Further, according to the present invention, an appliance for use in carrying out the aforesaid method comprises a membrane of a resiliently yieldable material, and means attached to the membrane for holding the membrane at the open end of a condenser coolant tube to close said end.

Further, according to the present invention from another aspect, an appliance for use in carrying out the aforesaid method comprises a body having a sealing surface for fluid-tight engagement with or around the end portion of a coolant tube, means defining a chamber within the body, a resiliently yieldable membrane constituting a wall of said chamber, and a duct or passage within the body to place said chamber in communication with the interior of a condensate tube.

Preferably, the said appliance comprises a tapered plug, a recess extending into the body of the plug from the larger end face thereof, a resiliently yieldable membrane covering the open side of said recess, and a through duct extending from said recess to the smaller end face of the plug.

Preferably, also, the said membrane comprises a cap of elastic material which cap fits over the larger end of the plug.

Preferably, also, the plug and the cap are of rubber.

An embodiment of the present invention will now be described, by way of example, with reference to the accompanying drawings in which:

FIG. 1 is a diagrammatic representation of the construction of a vapour condenser; and FIG. 2 is a sectional side elevation of part of the vapour condenser of FIG. 1 to a larger scale and shows an appliance for use in detecting leakage from a coolant tube to the condensate space in accordance with the present invention.

In the drawings, a vapour condenser, indicated generally by reference numeral 10, consists of a casing 11 the interior 12 of which constitutes a condensate space which is spanned by two sets 13 and 14 of coolant or condenser tubes. The casing 11 has a vapour inlet at 15 and a condensate outlet at 16. Each of the tube sets 13 and 14 consists of a plurality of metal tubes 17 the ends of which are held in the tube plates 18. The end portions of the tubes 17 are received in respective mating apertures in the tube plates 18 and are secured in sealing engagement with the tube plates by conventional end-flaring as illustrated at 19 in FIG. 2. The tube plates 18 are provided with removable dished covers 20 and 21 to form coolant in-flow and out-flow chambers 22 and 23 respectively.

In operation, vapour enters the condenser at 15 and is condensed on heat exchange through the walls of the tubes 17 which carry coolant, for example water, delivered to and from the chambers 22 and 23 respectively. Condensate is recovered at 16. During operation, a vacuum pressure condition exists within the condenser casing 11. Therefore, if one or more of the tubes 17 deteriorates and becomes perforated or ruptured, coolant will leak into the condensate space and contaminate the condensate. Leaking tubes 17 are located by the following method.

With the condenser 10 in operation, but on part-loading, one of the tube sets, say set 13, is drained and the associated covers 20 and 21 are removed. One end of each of the tubes 17 in the set in closed by means of a solid bung (not shown) pressed into the tube end. This operation is carried out using a set of bungs provided for the purpose, and all of the bungs are inserted at the same end of the tube set. The other ends of the tubes 17 in the set are closed by means of separate rubber membranes 24 which are carried by respective tapered rubber plugs 25 pressed into the tube ends. Each membrane 24 constitutes the centre portion of a molded rubber cap 26 which is shaped to fit snugly over a neck formed at the larger end of the plug 25 as can be seen in FIG. 2. The larger end face of the plug 25 is recessed at 27 and a narrow duct 28 is provided to place the recess 27 in communication with the smaller end face of the plug 25. When the operation of closing the said other ends of the tubes is complete, the membranes 24 are inspected and a note is made of each tube 17 on which a membrane 24 displays inwards deflection due to a vacuum pressure condition within the tube. In many cases, where a leak path exists between the tube and the condensate space, the membrane 24 is drawn fully into the recess 27 as shown by the broken line 24A in FIG. 2 within a few seconds. However, the leak path may be so small that full deflection of the membrane 24 may require a much greater time interval.

The above described method of leak detection has the advantages of greater speed and reduced skill requirement compared with previously proposed methods.

Modifications of the above described proposals, within the scope of the present invention include modifying the item—viz. the tapered plug 25—carrying the membrane to enable the membrane to be readily positioned at a tube end to close same according to the configuration of the tube end and/or its positional relationship with the tube plate 18. For example, if the tube end projects outwards from the tube plate 18, a simple cap fitting attached to the membrane would suffice. In some cases, the leak detection method may be applied where there is only a single set of tubes in which case a vacuum pressure condition is created within the casing by means of a vacuum pump or the like.

What is claimed is:

1. An appliance for detecting leakage from coolant tubes to a condensate space in a vapour condenser comprising a plug having a tapered body, a recess extending into the body from the larger end face thereof, a resiliently yieldable non protruding planar membrane covering and sealing the open side of said recess where said membrane forms the central part of a cap of elastic material which cap fits over the larger end of the body, and a through duct extending from said recess to the smaller end face of the body.

2. An appliance as claimed in claim 1, wherein said body is provided with an annular recess adjacent its larger end face and said cap is provided with an inwardly extending annular protrusion adapted to cooperate with said recess so as to retain said cap on said body.

3. An appliance as claimed in claim 1, wherein the plug and the membrane are of rubber.

* * * * *